US012766473B2

(12) United States Patent
Walter et al.

(10) Patent No.: US 12,766,473 B2
(45) Date of Patent: Oct. 20, 2026

(54) FEEDING AND BLENDING ASSEMBLY FOR A SYSTEM FOR CONTINUOUS PROCESSING OF POWDER PRODUCTS

(71) Applicant: Fette Compacting GmbH, Schwarzenbek (DE)

(72) Inventors: Nicolas Walter, Hamburg (DE); Marten Klukkert, Hamburg (DE); Wouter Emiel Grymonpré, Sint-Michiels (BE); Sven Kolbe, Buechen (DE); Joris Vanderputten, Buizingen (BE); Jozef Verheyen, Mortsel (BE); Anna Novikova, Hamburg (DE); Jurgen Boeckx, Steenokkerzeel (BE); Kris Schoeters, Kessel-Lo (BE); Jan Vogeleer, Bornem (BE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 17/533,787

(22) Filed: Nov. 23, 2021

(65) Prior Publication Data

US 2022/0161211 A1 May 26, 2022

(30) Foreign Application Priority Data

Nov. 26, 2020 (EP) .................................... 20210021

(51) Int. Cl.
*B01F 35/221* (2022.01)
*B01F 23/60* (2022.01)
(Continued)

(52) U.S. Cl.
CPC .......... *B01F 35/2211* (2022.01); *B01F 23/69* (2022.01); *B01F 23/80* (2022.01);
(Continued)

(58) Field of Classification Search
CPC ....... B30B 11/24; B30B 11/224; B30B 11/00; B01F 23/69; B01F 2101/22; B01F 23/80
See application file for complete search history.

(56) References Cited

U.S. PATENT DOCUMENTS 3,643,928 A * 2/1972 Stollman ............. B01F 35/7547 222/413
4,153,403 A * 5/1979 Schneider ........... B01F 35/7179 425/159

(Continued)

FOREIGN PATENT DOCUMENTS

CN 102438578 A 5/2012
CN 207267540 U * 4/2018

(Continued)

OTHER PUBLICATIONS

English Translation of ML Eng KK (JP H06344336) obtained on Jun. 28, 2023 from <https://worldwide.espacenet.com/> (Year: 2023).*

(Continued)

*Primary Examiner* — Claire X Wang
*Assistant Examiner* — Patrick M Mccarty
(74) *Attorney, Agent, or Firm* — Barclay Damon LLP

(57) ABSTRACT

A feeding and blending apparatus for a system for continuous processing of powder products comprises at least two system inlets for powder products; and at least two feeding and dosing devices arranged in a row. Each of the at least two feeding and dosing devices comprises, an inlet being connected with a system inlet, at least one feeder, at least one actuator configured to operate the at least one feeder, and an outlet being connected with an inlet of the powder blending device. A separation wall is configured to separate a process area from a technical. Process components of the at least two feeding and dosing devices are positioned in the process area and technical components of the feeding and dosing devices (Continued)

are positioned in the technical area. Connections between the at least one actuator and the at least one feeder pass through the separation wall.

17 Claims, 2 Drawing Sheets

(51) Int. Cl.

| | |
|---|---|
| ***B01F 23/80*** | (2022.01) |
| ***B01F 35/71*** | (2022.01) |
| ***B30B 11/00*** | (2006.01) |
| *B01F 101/22* | (2022.01) |

(52) U.S. Cl.

CPC ...... *B01F 35/714* (2022.01); *B01F 35/71731* (2022.01); *B01F 35/71775* (2022.01); *B01F 35/71815* (2022.01); *B30B 11/00* (2013.01); *B01F 2101/22* (2022.01)

(56) References Cited

U.S. PATENT DOCUMENTS

| | | | | | |
|---|---|---|---|---|---|
| 4,443,109 | A * | 4/1984 | Watts | B01F 33/80514 366/186 |
| 5,496,110 | A * | 3/1996 | Geier | B01F 29/322 220/203.01 |
| 5,527,107 | A * | 6/1996 | Weibel | B01F 23/60 366/156.2 |
| 5,827,909 | A * | 10/1998 | Des | B01F 23/43 521/64 |
| 5,956,228 | A * | 9/1999 | Zahorsky | H05K 7/20581 165/286 |
| 6,082,596 | A * | 7/2000 | Koch | A47G 19/186 222/575 |
| 9,713,910 | B2 * | 7/2017 | Vanderbroucke | A61K 9/2095 |
| 9,778,707 | B1 * | 10/2017 | San Clemente | G06F 1/182 |
| 10,016,340 | B2 * | 7/2018 | Boeckx | B29C 43/34 |
| 11,173,638 | B2 * | 11/2021 | Kitamura | B01F 27/906 |
| 2004/0173439 | A1 * | 9/2004 | Abdel-Hadi | B01F 35/79 198/659 |
| 2010/0236419 | A1 * | 9/2010 | Righetti | G01F 13/005 99/289 R |
| 2014/0142365 | A1 * | 5/2014 | Soyfer | G21F 9/30 588/20 |
| 2015/0114022 | A1 * | 4/2015 | Kreeley | H05K 7/20609 29/428 |
| 2015/0158057 | A1 * | 6/2015 | Gall | B08B 15/02 15/301 |
| 2017/0362071 | A1 * | 12/2017 | Showalter | B67D 1/0804 |
| 2018/0194567 | A1 * | 7/2018 | Schnitkey | B65G 39/09 |
| 2020/0156881 | A1 * | 5/2020 | Sommer | B29C 48/27 |
| 2021/0331399 | A1 * | 10/2021 | Seita | B29C 64/393 |
| 2022/0054359 | A1 * | 2/2022 | Singh | B65B 1/32 |

FOREIGN PATENT DOCUMENTS

| | | | | |
|---|---|---|---|---|
| CN | 209920286 | U | 1/2020 | |
| EP | 2427166 | B1 | 10/2013 | |
| EP | 3013571 | A0 | 12/2014 | |
| JP | H06 344336 | A | 12/1994 | |
| JP | 3709497 | B2 * | 10/2005 | B01L 1/00 |
| WO | 2014/207510 | A1 | 12/2014 | |

OTHER PUBLICATIONS

Eckhoff, Rolf K.. (2016). Explosion Hazards in the Process Industries (2nd Edition). (pp. 455-499). Elsevier. (Year: 2016).*

R.R. Maller, Passivation of stainless steel, Trends in Food Science & Technology, vol. 18, Supplement 1, Jan. 2007, (pp. S112-S115). (Year: 2007).*

Cotell, C., Sprague, J., Schmidt, F., Shot Peening, ASM International Handbook Committee. (1994). ASM Handbook, vol. 05—Surface Engineering. ASM International.(pp. 126-135). (Year: 1994).*

* cited by examiner

FEEDING AND BLENDING ASSEMBLY FOR A SYSTEM FOR CONTINUOUS PROCESSING OF POWDER PRODUCTS

CROSS REFERENCE TO RELATED INVENTION

This application is based upon and claims priority to, under relevant sections of 35 U.S.C. § 119, European Patent Application No. EP20210021.0, filed Nov. 26, 2020, the entire contents of which is hereby incorporated by reference.

FIELD OF TECHNOLOGY

The disclosure pertains to a feeding and blending assembly for a system for continuous processing of powder products, the feeding and blending assembly comprising at least two system inlets for powder products and at least two feeding and dosing devices, each having an inlet being connected with a system inlet, further comprising at least one powder blending device, the feeding and dosing devices each having an outlet being connected with an inlet of the powder blending device. The disclosure also pertains to a system for continuous processing of powder products.

BACKGROUND

Solid dosage forms or oral solid dosages (OSD), such as tablets or capsules, can be produced for example in tablet presses, for example rotary tablet presses, or capsule filling machines. In continuous production lines a powder mixture of for example at least one active pharmaceutical ingredient (API) and at least one excipient is continuously provided by a blending device and fed for example to the tablet press or the capsule filling machine. The powder products to be mixed in the blending device can be provided continuously at inlets of the continuous production line. Feeding and dosing devices can be provided for feeding and dosing the ingredients to be processed. Such a production process is also referred to as a direct processing or, in particular with regard to tablet presses, direct compression process, in contrast to a granulation process where additional devices and process steps are employed, such as dry or wet granulators, and potentially dryers, to improve the processability, such as flowability or compressibility, of a product not suited for direct processing or to avoid segregation of the product mixture. Another process, which is known as not direct processing, is a hot melt extrusion process where also additional devices and process steps are employed, such as hot melt extruders, coolers, pelletizers or flakers, to improve for instance the solubility or stability of the active pharmaceutical ingredient, of a product mixture not suited for direct processing. Generally, such systems can also be integrated in more complex processes, for example in wet granulation or dry granulation to feed either a wet granulator or a dry granulator.

A system and method for continuous production of solid dosage forms are known for example from EP 2 427 166 B1 or EP 3 013 571 A1. Such systems usually comprise a feeding and dosing system for feeding different powder products to a powder blender and blending the powder products to a product mixture which is subsequently processed in a production machine of the system for continuous processing of powder products. In practice, often more than two feeding and dosing devices with more than two feeders are provided since often more than two powder products shall be mixed in the powder blending device, for example one or more active pharmaceutical ingredients (API), one or more excipients and/or one or more lubricants. It is known to arrange the feeding and dosing devices in a circular setup. In this way it is easily possible to combine the product streams from the different feeders in the centre of the circular setup, for example to feed them into a joint inlet of a powder blending device. However, the known arrangement of the feeding and dosing devices leads to a large footprint with substantial unused space. Also, accessibility is limited and usually only given from the back of the feeders. It is in practice often necessary to remove the heavy feeders for cleaning and inspection/maintenance Cleaning and maintenance are therefore difficult and not economic. Also, it is often necessary to arrange the feeders on slides or pivots to access in particular process components of the feeder, such as the hopper and feeding screw, facing to the centre of the circular setup. This increases the required footprint further and makes the arrangement of the feeding and dosing devices more costly. Furthermore, for a change of the blender inlet position of a feeder, the whole feeder must be moved to another location. This makes a slide or pivoting system even more complex. Moreover the slides or pivots are extra components that need cleaning, making the cleaning more complicated and the change over time from one product mixture to another product mixture much longer.

Starting from the prior art explained above it is an object of the present invention to provide a feeding and blending apparatus as well as a system for continuous processing of powder products as mentioned above, which have a reduced footprint, access to process components of the feeding and dosing devices is facilitated, such that removal of process components is easier and faster, also faster cleaning by minimizing the number of components to be cleaned, so that change over times are reduced, and the construction is simpler and less costly.

BRIEF SUMMARY OF THE INVENTION

For a feeding and blending apparatus of the above-mentioned type, the invention solves the object in that the feeding and dosing devices are arranged in a row, wherein a separation wall is provided separating a process area from a technical area, wherein in the process area process components of the feeding and dosing devices, including at least feeders of the feeding and dosing devices, are arranged, and wherein in the technical area technical components of the feeding and dosing devices, including at least actuators for actuating the feeders, are arranged, wherein connections between the actuators and the feeders pass through the separation wall.

In an embodiment, the feeding and blending apparatus serves to feed and blend powder products for continuous processing in a corresponding system. In this system, for example solid dosage forms may be produced. The solid dosage forms may in particular be oral solid dosages (OSD). They can be produced from for example a dry powder product fed into the system through the system inlets. The invention may pertain to a direct processing system. In particular in systems including a tablet press this is also referred to as a direct compression system. In the feeding and blending apparatus, powder products, such as one or more active pharmaceutical ingredients (API), one or more excipients and/or one or more lubricants are fed and continuously blended in the powder blending device. The powder blending device may in particular be a dry powder blending device. The product mixture produced in the powder blending device may thus be a dry powder product mixture. The dry powder product mixture may be a non-bonded dry powder product mixture. Directly following the blending step solid dosage forms may be continuously produced in a production machine, for example tablets by compression of the powder products in a tablet press. Of course, the production machine could also be a different direct processing production machine, like a capsule filling machine, where capsules are filled with for example powder products. Furthermore, the production machine could also be a granulation machine, like a wet granulator or a dry granulator, or an extrusion machine, like a hot melt extruder, or a sachet filler. The inventive feeding and blending apparatus, as well as the inventive system for continued processing a powder product are continuous systems. This includes the possibility of intermittent process components of process steps included in the inventive systems. The powder blending device can also be integrated in further, complex, processes, for example in wet granulation or dry granulation to feed either a wet granulator or a dry granulator.

The powder blending device may be any type of continuously operating blending device, where infeed and outfeed are preferably continuous product streams. The blending device could for example be a screw blender. The blending device can comprise a blending tube. The blending tube can for example be arranged substantially horizontally. The inlet or the inlets of the blending device can be provided at the upper side of the blending tube. The outlet can be arranged at the lower side of the blending tube.

As indicated, the powder products may for example be APIs, excipients and/or lubricants. The system may have more than two system inlets for more than two different powder products to be processed. The blending device may have a joint inlet for more than one powder products fed from the feeding and dosing devices. The blending device may also have more than one inlet for powder products fed from the feeding and dosing devices.

Connections between components of the disclosed feeding and blending apparatus, as well as the disclosed system for continuous processing of powder products, can be provided for example in the form of pipes, hoses, bellows or the like. Any inlets and outlets may be designed detachable, such that they can be detached from a respective connection. However, they may also be non-detachable such that they are fixedly connected with the respective connection they are fitted to, for example integrated with the respective connection. The inlets and outlets may have closure devices for closing off the respective connection they are fitted to. However, they may also be provided without such closure devices such that access to the respective connection may be always open.

The feeding and dosing devices may for example comprise loss in weight feeders. Such loss in weight feeders are generally known to the person skilled in the art and thus do not need to be explained in detail. Generally, they feed and dose powder product based on measuring results of a weight sensor. The feeding and dosing devices usually comprise actuators for actuating the feeders, like drives for driving the feeders. Usually, each feeding and dosing device is in connection with one system inlet, especially via a refill system, wherein through the system inlet the respective powder product is introduced into the system. As already explained, the powder blending device may comprise one or more than one inlet. Outlets of different feeding and dosing devices may be connected with the same inlet of the powder blending device. However, it is also possible that outlets of different feeding and dosing devices are connected with different inlets of the powder blending device.

In an embodiment, the feeding and blending apparatus may comprise more than two feeding and dosing devices, for example three, four, five, six or more than six feeding and dosing devices. According to the invention, the feeding and dosing devices are arranged in a row, thus not in a circular set up as in the prior art. More specifically, the feeding and dosing devices may be arranged along an essentially straight line, particularly a horizontal line. Of course, depending on the number of feeding and dosing devices, it would also be possible to arrange them along more than one row. If more than one row of feeding and dosing devices is provided the rows may be arranged for example along parallel horizontal axes.

The inventive arrangement of the feeding and dosing devices, in particular their feeders, in a row allows the provision of a preferably straight separation wall separating the process area from the technical area. Process components and technical components may as necessary be connected with one another through a connection. Such connections reach through the separation wall. These connections may be fed through the separation wall in a sealing manner, for example to not be detrimental to a potential dust tight separation of the process area from the technical area through the separation wall. Such connections between process components and technical components may preferably be quick release connections such that the respective process components and technical components can be easily connected and disconnected, for example for installation, cleaning or maintenance.

In an embodiment, the separation wall can provide a sealing between the process area and the technical area to avoid dust, in particular product dust, from penetrating the separation wall and thus traveling from the process area to the technical area. The separation wall can thus provide an intrinsic containment. The process components comprise in particular the feeders of the feeding and dosing devices, i.e. components which feed powder material to the powder blending device, such as a feeding screw, a feeder powder hopper, a powder agitator or a feeding screw outlet, or the like. Generally, process components are components which come into contact with the powder products to be processed during operation of the feeding and blending system, while technical components generally are components which do not come into contact with the powder products. Technical components are thus usually auxiliary components, such as actuators for actuating the feeders, like drives for driving the feeders, and so forth. Drives for driving the feeders may for example comprise electric motors, as mentioned above. Generally, actuators can for example comprise electric motors and/or vibration actuators. Connections can for example be mechanical connections (e.g. drive shafts), magnetic connections and/or electromagnetic connections.

In an embodiment, the separation wall could for example be made from a stainless steel sheet metal with a suitable surface treatment, like grinded or polished or glass bead blasted. If a “recess plate” in stainless steel is used, to mount process units onto, such a recess plate could be built into or onto the separation wall. The separation wall could also be made for example from a laminated or high pressure laminated (HPL) sheet with suitable outer skin or surface. HPL is particularly suitable for clean room wall panels, where also a thicker inner panel can be used for a stiffer and thicker construction panel. Other possible materials for the separation wall could be a polymer sheet like a polyester sheet, or a composite material sheet, like a glass reinforced polyester (GRP). Also, a flexible separation wall would be possible, made for example of a plastic film. Such a flexible and possibly disposable separation wall could be used as the inventive separation wall as well. A disposable separation wall could also be used in addition to a non-disposable separation wall, for example made of stainless steel. For example, an e.g. stainless steel process box could be used and lined with a removable plastic material.

In an embodiment, the process area may further be arranged in a protective housing. This enables sealing the process area towards the environment, for example in a dust tight manner or under containment conditions. Another benefit of such a protective housing is the ability to implement a pressure difference between the process area and the technical area, and potentially a clean room. For example, a negative pressure can be established in the process area relative to the technical area and potentially a clean room. This avoids powder leakages out of the system. The protective housing may be positioned against the separation wall enveloping the feeding and dosing devices and/or automatic refill systems and/or the powder blending device. The feeding and dosing devices together with the powder blending device may form a feeding, dosing and blending module. This feeding, dosing and blending module may be arranged in the protective housing, which thus forms a module housing. Such an embodiment allows for easily meeting containment requirements. It would of course also be possible for the protective housing to form a system housing together with a housing of a production machine, for example a tablet press housing or a capsule filling machine housing. The protective housing may thus be integrated or connected with the production machine housing. This leads to a particular compact design, again allowing to easily meet containment requirements. The separation wall may also be part of a wall between two rooms, wherein one room, the technical room, contains the technical area and the other room, the production room, contains the process area. This provides for a particular defined separation of the two areas. Also possible would be a so-called “against-the-wall” setup. In this setup the system is placed with its back against a clean room wall. A through-hole in the clean room wall provides access to the technical area, from the technical room. According to a further particularly practical embodiment, the separation wall may be part of the protective housing.

Generally, an arrangement of feeders in a line may be considered disadvantageous when feeding for example to one joint inlet of a blender. As explained above, it is then easier to provide a circular setup and to feed the different powder streams through the centre of the circular setup to the joint inlet of the powder blending device. However, the inventors at hand have found advantages of the above explained inventive arrangements which supersede this disadvantage. First of all, the inventive arrangement in a row leads to a smaller footprint, reduced by around half compared to the circular setup of the prior art. Access to the components in the technical area, and in particular in the process area is easy from the back and front of the system.

With the feeders arranged in a line, it is easy to add or remove feeders to the line. There is no need for complex slides or pivots, which are also difficult to clean, to give access to the process components, such as the feeders. Also, it is not necessary to remove components, such as heavy feeders, for maintenance since the technical components of the feeders can easily be accessed from the technical area. The inventive machine architecture allows for a clear separation of the process area from the technical area, unlike the arrangement in the prior art. This allows a clear and full separation of process components from technical components. The potentially smaller process area may contain the process components, such as the feeders, the blender and for example automatic refill units. The potentially larger technical area may contain components such as actuators, comprising for example motors, loadcells, sensors, electrical cabling, electronics, pneumatics. With this arrangement, an intrinsic product containment can be achieved and cleaning is facilitated as well as accessibility while at the same time change over times are reduced due to easy removal and installation. By separating technical components as much as possible from the process components, and moving the technical components into the technical area, the total weight of the process components can be drastically reduced, making it much easier and faster to remove the process components. The as such attained low weight of the process components facilitates the manual removal of process components and avoids to use of lifting and removal tools such as lifts, guiding rails, slides, transport carts, or the like.

According to an embodiment, the system further comprises automatic refill systems for the feeders, wherein refill units of the automatic refill systems for automatically refilling the feeders with powder product are arranged in the process area, and wherein at least actuators for actuating the refill units, like drives for driving the refill units, are arranged in the technical area, wherein connections between the actuators and the refill units pass through the separation wall. Such automatic refill systems are connected with product supplies for the respective powder products. The refill units can each comprise for example a dosing or refill screw, particularly a horizontal dosing or refill screw, transporting the powder product from the supply to the feeders. Such automatic refill systems reduce the risk of blockage for example when processing cohesive materials, lead to an accurate refill, also for low volumes, avoid leakages by using for example a shut off valve, have less negative impact on the feeder performance, in particular no densification effect of the powder product, or no strong fluidisation of the powder product causing the powder product to flush through the feeding system, and are usually of a simple design such that they are easy to assemble and clean. The refill units are also in contact with the powder products. Thus, it is beneficial to arrange them in the process area as well. Technical components, such as the actuators for actuating the refill units, like drives for driving the refill units, are again arranged in the technical area, and a connection is fed through the separation wall. Again, the connection may be a quick release connection. The actuators for actuating the refill units may for example comprise electric motors and/or vibration actuators. The actuator for actuating the shut off valve of the refill units may for example comprise pneumatic cylinders. Again, by separating the technical components from the refill units, the refill units can be embodied in a lightweight execution, facilitating manual removal without the use of tools.

The refill units of the automatic refill systems may each be arranged above a feeder of the feeding and dosing devices, wherein the refill units each comprise a horizontal refill screw, wherein preferably the refill screws are arranged with a pitch angle towards each other. When arranging for example three or more than three refill units above three or more than three feeders, wherein the refill screws are not arranged with a pitch angle towards each other, the refill units will then necessitate a minimum distance between the inlets of the feeders which is larger than required by the feeders themselves. This in turn leads to a larger distance between the outlets of the feeders than necessary. For example, if a funnel or hopper is arranged between the feeder outlets and a blender inlet the funnel needs to have a wider funnel inlet than necessary. This leads to a less steep funnel, which is undesired due to the risk of flowability problems of the powder products. The pitch angle of the horizontal refill screws towards each other allows for a smaller distance between the feeder inlets than between the refill inlets. Thereby more distance can be created between the product inlets. The above embodiment thus facilitates more space for the raw material charging systems. The pitch angle may be the same between each pair of neighboring refill screws. The refill screws may thus be arranged like spokes on a wheel. The pitch angle may for example be less than 45°, preferably less than 30°.

The automatic refill units of the automatic refill systems may of course also comprise different components, such as for example powder valves or discharge valves, in particular metering valves, or rotary dosing valves. In particular discharge valves provide the possibility to use a vacuum receiving hopper (which typically ends with a powder discharge valve) of a pneumatic transport system, as a refill unit. This allows an essentially direct coupling of a pneumatic transport system with the feeder hopper.

According to a further embodiment, a powder blender of the powder blending device may also be arranged in the process area, wherein at least one actuator for actuating the powder blender, like at least one drive for driving the powder blender, may also be arranged in the technical area, wherein at least one connection between the at least one actuator and the powder blender passes through the separation wall. As for the other actuators, the actuator can for example comprise an electric motor for driving a part of the blender, for example a blending screw. The powder blender is a further device in direct contact with the powder products. It is thus beneficial to arrange the powder blender in the process area as well. Again, components of the powder blending device not in contact with powder products, such as actuators, may be arranged in the technical area. A connection is fed through the separation wall. Again, the connection may be a quick release connection. Again, by removing technical components from the powder blending device, the powder blending device can be embodied in a lightweight execution, facilitating manual removal without the use of tools.

Further, drives, load cells, sensors, cabling and/or electronic components of the feeding and dosing devices and/or of the automatic refill systems and/or of the powder blending device may be arranged in the technical area since all these components do not come in direct contact with the powder products.

In an embodiment, the separation wall may provide a separation of the technical area from the process area under containment conditions. In particular, the separation wall may be dust tight and thus contained. The containment level may for example be for product toxicity level OEB 3, OEB 4, OEB 5 or higher, measured for example according to the ISPE Good Practice Guide: Assessing the Particulate Containment Performance of Pharmaceutical Equipment. Any connections fed through the separation wall may thus also meet the required conditions to be dust tight and thus contained.

Generally, any of the outlets of the feeding and dosing devices may be connected with an inlet of the powder blending device in any suitable manner, for example a preferably vertical connecting tube.

According to a further embodiment, at least one funnel or hopper may be provided between the feeders and the powder blending device, in particular the powder blender, said at least one funnel or hopper having a funnel or hopper inlet being connected with at least two outlets of the feeding and dosing devices, and having an outlet being connected with an inlet of the powder blending device. The funnel or hopper may for example have a conical shape, having a larger inlet than outlet. Providing such a funnel or hopper allows combining product flows coming from outlets of different feeding and dosing devices into one inlet of the powder blending device in a particularly easy manner. The at least one funnel or hopper may for example consist of a metallic material. Of course, it would also be possible to connect one or more than one of the feeder outlets directly with one or more of the blender inlets, for example via a tube connection. Such a connection could also be present in addition to, particularly next to a funnel.

In an embodiment, at least two feeding and dosing devices may be configured to discharge product to the funnel or hopper inlet from at least two outlets of the feeding and dosing devices at different flow rates. In this manner different powder products can be fed to the blender in different quantities, depending on the desired product ratio to be processed.

In an embodiment, the feeding and blending apparatus may further comprise at least two funnels or hoppers, wherein the at least two funnels or hoppers have funnel or hopper inlets of different widths, wherein the at least two funnels or hoppers can be arranged alternatively or in combination between the feeding and dosing devices and the powder blending device. In this manner a broader range of different feeder blender configurations is possible tailored to the specific desired formulations. Process flexibility is accordingly increased. The modular funnel or hopper design with different funnels or hoppers of different sizes and/or shapes allows different feeder blender configurations. For example, by choosing the appropriate funnel or hopper, product streams from different feeding and dosing devices can be combined into one product stream to be fed to a joint inlet of the powder blender. Depending on for example the width of the funnel or hopper inlet, more or less outlets of feeding and dosing devices can discharge their product stream into the funnel or hopper. The funnels or hoppers can also be arranged in different positions, thus collecting product streams from different feeding and dosing devices.

By using a funnel or hopper, it is for example also possible to feed a minor or a particularly challenging ingredient upon a major ingredient stream. A challenging ingredient can for example be an ingredient with poor flow properties, for example high cohesiveness. In this manner a dosing inaccuracy risk can be minimized and a continuous pre-mixing can be carried out already in the funnel or hopper prior to reaching the powder blender.

The at least one funnel or hopper may further be provided with a vibration device for vibrating the at least one funnel or hopper, preferably an ultrasonic vibration device. Such flow-aids, for example ultrasonic flow-aid, facilitates the processing of poorly flowing ingredients by reducing the friction. It helps to prohibit material build up in the funnel or hopper and can help to guarantee a starve-fed behaviour. In particular, it ensures that the funnel or hopper is not filled with powder, but is merely guiding or deflecting the powder streams from the feeder outlets to the blender inlets.

According to a further embodiment at least one funnel or hopper may be surface treated by abrasive blasting, preferably using a suspension comprising a liquid and abrasive particles. By using an abrasive blasting, preferably with liquid and abrasive particles, powder flow is improved by reducing the adhesion of the powder product to the surface of the funnel or hopper, thereby reducing the friction of the powder product to the surface of the funnel. By using an abrasive blasting with liquid and abrasive particles, reduction of adhesion is attained by different types of surface improvement, acting more or less at the same time, such as reduction of the surface roughness (lower Ra values), improved surface topography, isotropic treated surface, higher hydrophobicity, less risk of creating static electricity by friction.

According to a further embodiment, at least one funnel or hopper may be surface treated by abrasive blasting and shot peening, in particular micro shot peening, preferably using a suspension comprising a liquid and a mixture of spherical and irregular shaped abrasive particles. The surface treatment can thus be done by abrasive blasting and micro shot peening at the same time, preferably using a suspension comprising a liquid and a mixture of both spherical and irregular shaped particles. By using an abrasive blasting and micro shot peening at the same time using a suspension comprising a liquid and a mixture of at least two different types of abrasive particles, powder flow is improved even further, by further reduction of powder adhesion with surface improvements of a conventional shot peening such as closure of micro-fissures and micro-perforations, but without the disadvantageous surface deformation and surface stresses induced by conventional shot peening. The surface treatment may further be done by abrasive blasting and micro shot peening at the same time using a suspension comprising a liquid and a mixture of at least two different types of abrasive particles, whereby both spherical and irregular shaped particles are used. This further improves flowability.

Flow aids, improving flowability of powder product in funnels or hoppers could also comprise a surface coating of the at least one funnel or hopper that reduces the friction with dry powder. For instance, a coating with a suitable polymer for dry powder friction reduction, like a PTFE, FEP or PFA coating, or any other suitable non-stick for dry powder coating, could be applied.

Flow aids could also comprise using a suitable material like a conductive material, preferably a stainless steel, for the at least one funnel or hopper. Using a conductive material will remove the electro-static charges of the powder, that appear into the powder due to the triboelectric effect, and that can be induced either by automatic refill systems or the feeding and dosing devices, or by powder sliding into the funnel or hopper itself. Flow aids could also comprise a suitable material like a non-conductive material, preferably a polar polymer with a very low surface roughness. Polymers typically are either polar or non-polar, and the polarity of polymers can also be changed. The powder products used in the pharmaceutical industry, for powder processing, are typically polar materials. Some powder products are less affected by the triboelectric effect and more affected by their polar properties. For those powder products it can be more advantageous to use a polar polymer of the same polarity as the powder product, so that the powder product is repulsed by the polymer, thereby reducing the powder adhesion and friction to the polymer.

In addition or alternatively to funnels or hoppers, any (predominantly) horizontal powder transport system could be provided between the feeders and the powder blending device, in particular the powder blender, said horizontal powder transport system having one inlet or more than one inlets being connected with at least two outlets of the feeding and dosing devices, and having an outlet being connected with an inlet of the powder blending device. Such predominantly horizontal powder transport systems could for example comprise horizontal powder screws, vibration chutes or tubes or transport belts. Any of the embodiments explained above with regard to funnels or hoppers may also be applied to such a horizontal powder transport system.

Also, any of the above explained embodiments, i.e. connecting tubes, funnels, hoppers, and horizontal powder transport systems could be combined in any feasible manner in the inventive system, depending on the specific process requirements.

According to a further embodiment the powder blending device may have more than one inlet, wherein at least some of the outlets of the feeding and dosing devices are connected with different inlets of the powder blending device. This embodiment allows to define different mixing energies. For example, a powder product fed to a more downstream inlet of the powder blending device will be subjected to the blending process for a shorter time than a powder product fed to a more upstream inlet of the powder blending device. Thus, different mixing times can be flexibly chosen, and for a given mixing intensity, the resulting mixing energy can be chosen.

The invention also solves the object with a system for continuous processing of powder products, comprising a feeding and blending system according to the invention, wherein the powder blending device comprises an outlet for a product mixture produced in the powder blending device, further comprising a production machine, wherein the production machine comprises an inlet being connected with the outlet of the powder blending device, and wherein the production machine comprises an outlet. For some applications, for example in research and development, it might be the purpose to discharge the powder blend directly into a container. In that case the system may also be provided without a production machine.

The system has already generally been explained above. It is possible that the feeding and blending apparatus and the production machine are arranged on the same level, in particular the same floor level. The system may thus be a one-floor system. However, it would also be possible to arrange for example the feeding and blending apparatus above the production machine, in particular on an upper floor level, thus effectively providing a two-floor system. The production machine continuously processes the product mixture produced in the powder blending device, in particular the powder blender, and discharges the processed products at the outlet. As explained above, the system is a continuously working system. The system may be a dust-tight system.

A product conveying device may be positioned in a connection between the outlet of the powder blending device and the inlet of the production machine, said product conveying device continuously conveying the product mixture from the outlet of the powder blending device to the inlet of the production machine. The product conveying device may for example be a pneumatic product conveying device, for example a vacuum dense phase product conveying device. Such a conveying device is particularly suited for continuously conveying the powder mixture from the outlet of the powder blending device to the inlet of the production machine, in particular when having a one-floor arrangement of the system. Such a conveying device helps to reduce segregation of the product during conveying and thus improves quality of the processed products. The product conveying device may for example comprise a hose for conveying the product mixture.

According to a further embodiment the continuous processing of powder products may be a continuous production of solid dosage forms in direct processing, wherein the production machine may be for continuously producing solid dosage forms from the product mixture, wherein the outlet of the production machine is an outlet for discharging produced solid dosage forms. The production machine may preferably be a tablet press or a capsule filling machine or a sachet filling machine. The solid dosage forms may accordingly be tablets or (filled) capsules or (filled) sachets. The tablet press may in particular be a rotary tablet press. However, the production machine may also be a different production machine, such as a granulation device or an extrusion device. The system may also comprise more than one production machines and/or more than one feeding and blending systems.

BRIEF DESCRIPTION OF THE DRAWINGS

An embodiment of the invention is explained in more detail below with reference to drawings. The drawings schematically show.

In the drawings the same reference numerals shall denote the same parts.

DETAILED DESCRIPTION OF THE INVENTION

Figure 1:
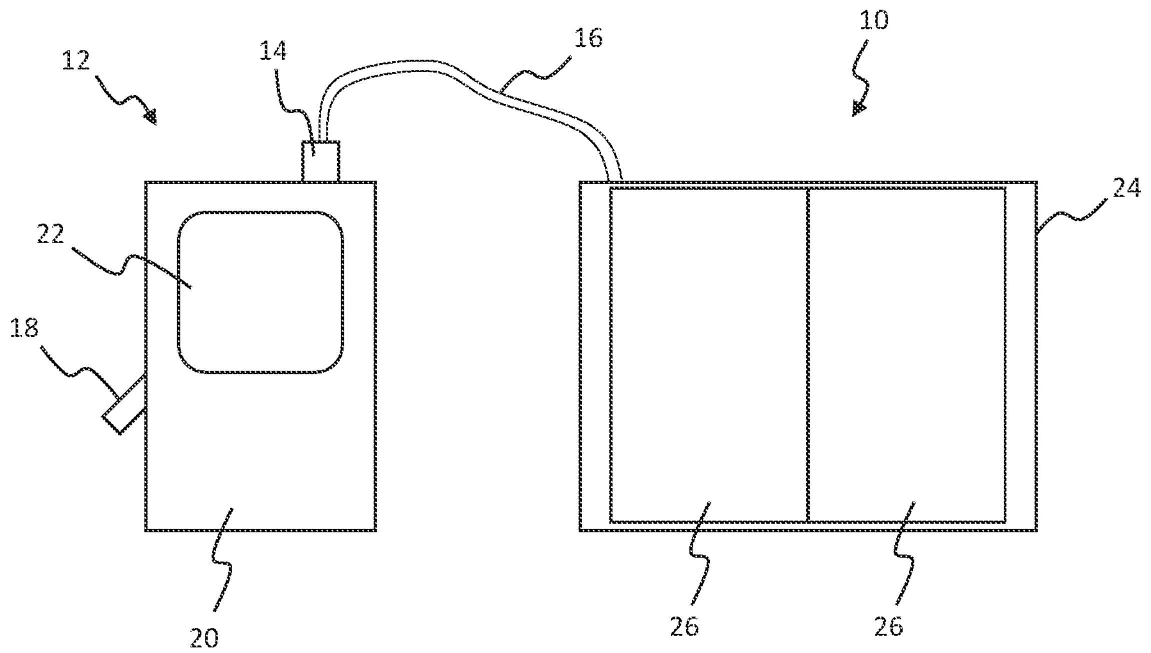
FIG. 1 illustrates a front view of an embodiment of a system for continuous processing of powder products.

The system for continuous processing of powder products shown in FIG. 1 is a system for continuous production of solid dosage forms in direct processing. The system comprises a feeding and blending apparatus 10 and a production machine 12, for example a tablet press, such as a rotary tablet press, or a capsule filling machine, or a sachet filling machine, or a granulation machine or an extrusion machine. The production machine 12 comprises an inlet 14 which is connected with a hose 16 of a product conveying device conveying a product mixture from the feeding and blending apparatus 10 to the inlet 14 of the production machine 12, where the product mixture is continuously processed to solid dosage forms, such as tablets or capsules or sachets. The produced solid dosage forms are discharged via an outlet 18 of the production machine 12. The production machine 12 comprises a machine housing 20 with a window 22. The feeding and blending apparatus 10 comprises a system housing 24 with two doors 26, which are shown in an opened state in FIG. 2 to view the internal parts of the feeding and blending apparatus 10. The system shown in FIG. 1 is a one-floor arrangement where the feeding and blending apparatus 10 and the production machine 12 are provided on the same level, in particular the same floor level.

Figure 2:
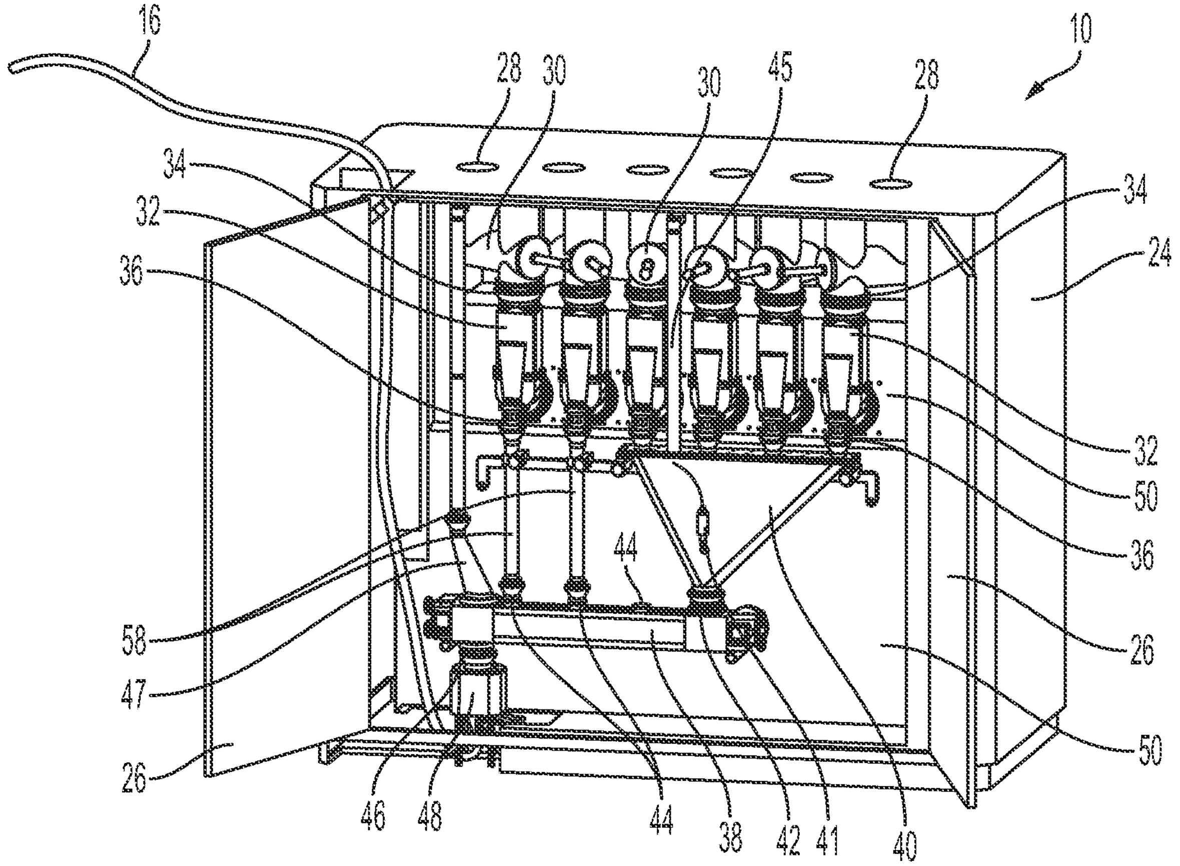
FIG. 2 illustrates a perspective front view of an embodiment of a feeding and blending apparatus of the system shown in FIG. 1.
Figure 3:
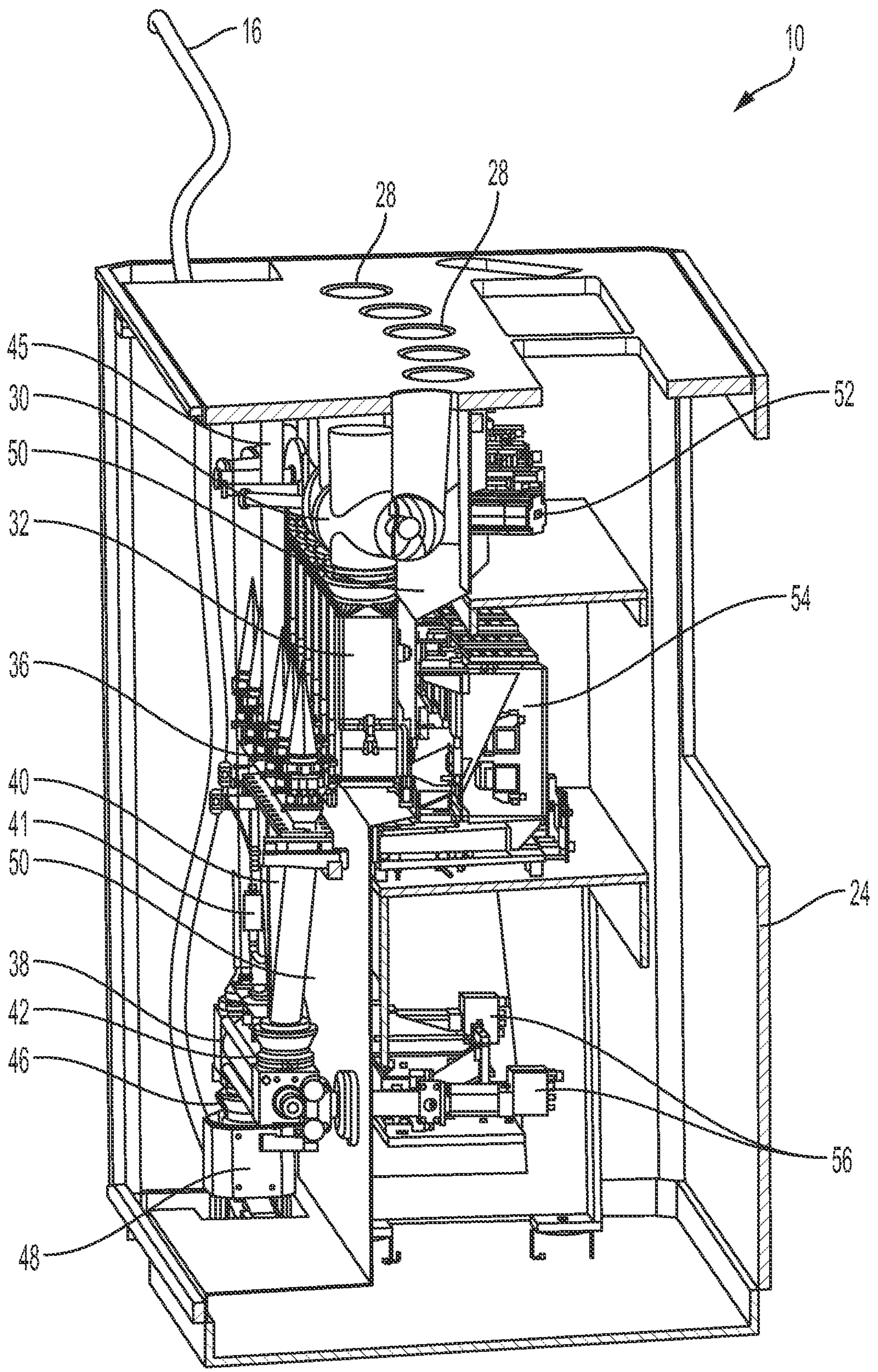
FIG. 3 illustrates a partial sectional view of the embodiment of the feeding and blending apparatus shown in FIG. 2.

In FIGS. 2 and 3, six (6) system inlets 28 can be seen via which different powder products can be introduced into the feeding and blending apparatus 10. The system inlets 28 lead to six automatic refill systems, each comprising a refill unit 30 comprising a horizontal refill screw. As can be seen in FIG. 2, the refill units 30 are arranged at a pitch angle towards each other such that the inlets of neighbouring refill units 30 have a larger distance from one another than the inlets of feeders 32 of feeding and dosing devices arranged underneath the automatic refill systems. As can be seen in FIGS. 2 and 3, the feeding and dosing devices, in particular the feeders 32, are arranged in a row, in particular along a horizontal line. The feeding and dosing devices, in particular the feeders 32, each comprise an inlet 34 arranged between the refill units 30 and the feeders 32. The feeding and dosing devices, in particular the feeders 32, further each comprise an outlet 36 for feeding a powder product supplied via the inlets 28 and the refill units 30 to a powder blender 38 of a powder blending device. The powder blender 38 comprises a horizontal blending tube in which a blending screw is arranged for blending the different powder products to the desired product mixture. In the embodiments shown in the drawings, a funnel 40 is arranged between the feeders 32 and the powder blender 38, said funnel combining product streams from four of the six feeders 32 into one product stream and into a first inlet 42 of the powder blender 38. The funnel 40 is equipped with a vibration device 41 for vibrating the funnel 40, in the shown example an ultrasonic vibration device 41. This improves flowability of powder products inside the funnel 40. The powder blender 38 comprises further inlets 44 through which powder streams from further feeders 32 can be introduced into the powder blender 38 for example via vertical tubes 58. A venting pipe 47 is provided on the end opposite inlet 42 of the powder blender 38 for venting air into the process area for pressure equalisation. Another venting pipe 45 is provided for the funnel 40 and feeder outlets. The powder blender 38 further comprises an outlet 46 through which the produced product mixture is provided to a product conveying device 48, which conveys the product mixture via hose 16 to the inlet 14 of the production machine 12 for further processing.

As can be seen in particular from FIGS. 2 and 3, a separation wall 50 is provided inside system housing 24 separating a process area, seen in FIG. 2, and seen in FIG. 3 on the left-hand side, from a technical area, not shown in FIG. 2, and seen in FIG. 3 on the right-hand side. This separation wall 50 may provide a contained or dust tight separation between the process area and the technical area, as explained above. In the process area, process components of the automatic refill systems, the feeding and dosing devices and the powder blending device are arranged which come into direct contact with the powder products to be processed. For easier and manual installation and removal these process components can be embodied in a lightweight execution. In the technical area, technical components of the automatic refill systems, the feeding and dosing devices, and the powder blending device are arranged which do not come into direct contact with the powder products. In the case at hand these technical components comprise actuators 52 for actuating the refill units 30, actuators 54 for actuating the feeders 32, and actuators 56 for actuating the powder blender 38. The actuators 52, 54, 56 may for example be drives for driving the refill units 30, the feeders 32, and the powder blender 38, respectively. The actuators 52, 54, 56 may comprise for example electric motors. The connection between the technical components, such as the actuators 52, 54 and 56, and the process components, such as the refill units 30, the feeders 32, and the powder blender 38, are arranged in a through the wall technique through the separation wall 50. For easier installation and maintenance these connections may be quick release connections. While the system housing 24 provides a protective housing 24, the separation wall 50 securely separates the process area, in which the powder products are handled, from the technical area, where no powder products shall be present. In this manner on the one hand an intrinsic containment can be achieved of the process area in comparison to the technical area, and on the other hand a containment towards the environment can be achieved through the protective housing 24. Also, the housing 20 of the production machine 12 may provide containment towards the environment, as generally explained above.

LIST OF REFERENCE NUMERALS

10 feeding and blending system
12 production machine
14 inlet of production machine
16 hose
18 outlet of production machine
20 machine housing
22 window
24 system housing/protective housing
26 doors
28 system inlet
30 refill units
32 feeders
34 inlets of feeders
36 outlets of feeders
38 powder blender
40 funnel
41 vibration device
42, 44 inlets of powder blender
46 outlet of powder blender
45, 47 venting pipes
48 product conveying device
50 separation wall
52 actuators for refill units
54 actuators for feeders
56 actuators for powder blender
58 vertical tubes

The invention claimed is:

1. A feeding and blending apparatus for a system for continuous processing of powder products, the feeding and blending apparatus contained in a housing, comprising:

at least two system inlets for powder products;

at least two feeding and dosing devices arranged in a row, wherein each of the at least two feeding and dosing devices comprises, an inlet being connected with a system inlet, at least one feeder, at least one actuator structured to shut-off the at least one feeder, and an outlet being connected with an inlet of a powder blending device;

a vertical separation wall positioned within the housing and configured to separate the housing into a process area and a technical area, wherein the process area comprises an access on a front side of the housing and wherein the technical area comprises an access on a back side of the housing; and at least two refill units that are positioned above each feeder of the at least two feeding and dosing devices and configured to refill each of the feeders, wherein each of the feeders is associated with one of the at least two refill units, wherein each of the at least two refill units is configured to be actuated by at least one actuator to automatically refill the associated feeder with powder product, wherein the at least two refill units each comprise a horizontal refill screw, and wherein each horizontal refill screw is positioned with a pitch angle relative to a horizontal axis towards another horizontal refill screw such that inlets of the at least two refill units are positioned at a larger distance from each other than inlets of the at least two feeding and dosing devices positioned below the at least two refill units are positioned from each other, wherein the process area is maintained at a lower pressure than the technical area, wherein process components of the at least two feeding and dosing devices are positioned in the process area, wherein each of the feeders is a process component, wherein technical components of the at least two feeding and dosing devices are positioned in the technical area, wherein each actuator of the at least two feeding and dosing devices is a technical component, wherein connections between each actuator and each of the feeders of the at least two feeding and dosing devices comprises a sealed pass through the vertical separation wall, wherein the vertical separation wall inhibits the powder product from the process area from entering the technical area, wherein the at least two refill units are positioned in the process area, and wherein each actuator is configured to actuate each corresponding refill unit and is arranged in the technical area, and wherein connections between each actuator and each corresponding refill unit pass through the vertical separation wall.

2. The feeding and blending apparatus according to claim 1, wherein the technical area further comprises at least one of: (1) drives; (2) load cells; (3) sensors; and (4) cables.

3. The feeding and blending apparatus of claim 1, wherein a connection between a process component and a technical component comprises a quick release connection.

4. The feeding and blending apparatus of claim 1, wherein the connections between each actuator and each feeder comprise quick release connections.

5. The feeding and blending apparatus according to claim 1, wherein the process area is positioned within the housing.

6. The feeding and blending apparatus according to claim 5, wherein the vertical separation wall is part of the housing.

7. The feeding and blending apparatus according to claim 1, wherein the powder blending device comprises, a powder blender comprising a first inlet and a venting pipe; and at least one actuator configured to actuate the powder blender, wherein the powder blender is positioned in the process area and the at least one actuator is positioned in the technical area, and wherein at least one connection between the at least one actuator to actuate the powder blender and the powder blender comprises a sealed pass through the vertical separation wall.

8. The feeding and blending apparatus according to claim 7, further comprising at least two hoppers, wherein the at least two hoppers comprise hopper inlets of different widths, and wherein the at least two hoppers are positioned between the at least two feeding and dosing devices and the powder blending device.

9. The feeding and blending apparatus according to claim 7, wherein the powder blending device comprises more than one inlet and wherein at least one outlet of the at least two feeding and dosing devices is connected with a different inlet of the powder blending device.

10. The feeding and blending apparatus according to claim 7, further comprising at least one hopper positioned between the at least one feeder and the powder blending device, wherein the at least one hopper comprises, an inlet being connected with at least two outlets of the at least two feeding and dosing devices, and an outlet connected with the inlet of the powder blending device.

11. The feeding and blending system according to claim 10, wherein the at least one hopper comprises a vibration device configured to vibrate the at least one hopper.

12. The feeding and blending apparatus according to claim 10, wherein the at least one hopper is surface treated by abrasive blasting.

13. The feeding and blending apparatus according to claim 10, wherein the at least one hopper is surface treated by abrasive blasting and shot peening.

14. A system for continuous processing of powder products, comprising:

a feeding and blending system according to claim 7; and a production machine comprising an outlet, wherein the powder blending device comprises an outlet configured to dispense a product mixture produced in the powder blending device, and wherein the production machine comprises an inlet connected with the outlet of the powder blending device.

15. The system according to claim 14, further comprising a product conveying device positioned between the outlet of the powder blending device and the inlet of the production machine and configured to continuously convey the product mixture from the outlet of the powder blending device to the inlet of the production machine.

16. The system according to claim 15, wherein the production machine is configured to continuously produce solid dosage forms from the product mixture.

17. The system according to claim 15, wherein the production machine is one of a (1) tablet press, (2) a capsule filling machine, and (3) a sachet filling machine.

* * * * *